(12) United States Patent
De Los Reyes

(10) Patent No.: US 8,559,636 B2
(45) Date of Patent: Oct. 15, 2013

(54) AUTHENTICATING NETWORK ELEMENTS IN A COMMUNICATION SYSTEM

(75) Inventor: Gustavo De Los Reyes, Fair Haven, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 227 days.

(21) Appl. No.: 13/046,757

(22) Filed: Mar. 13, 2011

(65) Prior Publication Data
US 2012/0230488 A1  Sep. 13, 2012

(51) Int. Cl.
*H04K 1/00* (2006.01)
*G06F 7/04* (2006.01)

(52) U.S. Cl.
USPC .............................................. 380/247; 726/2

(58) Field of Classification Search
USPC ................................. 380/247, 270, 278; 726/2
See application file for complete search history.

(56) References Cited

U.S. PATENT DOCUMENTS

| | | | |
|---|---|---|---|
| 7,302,252 B2 * | 11/2007 | Okochi | 455/411 |
| 7,324,805 B2 * | 1/2008 | Nakakita et al. | 455/411 |
| 7,336,670 B1 | 2/2008 | Calhoun | |
| 7,486,952 B1 * | 2/2009 | Davies et al. | 455/436 |
| 8,046,583 B2 * | 10/2011 | Taniguchi | 713/171 |
| 2008/0002829 A1 * | 1/2008 | Forsberg et al. | 380/247 |
| 2008/0130898 A1 | 6/2008 | Holtmanns | |
| 2008/0186166 A1 * | 8/2008 | Zhou et al. | 340/539.13 |
| 2008/0220749 A1 | 9/2008 | Pridmore | |
| 2009/0023424 A1 | 1/2009 | Martin | |
| 2009/0136036 A1 * | 5/2009 | Okada | 380/272 |
| 2011/0164749 A1 * | 7/2011 | Natarajan | 380/270 |

OTHER PUBLICATIONS

Meyer and Wetzel in "On the Impact of GSM Encryption and Man-in-the-Middle Attacks on the Security of Interoperating GSM/UMTS Networks," proceedings of the 15.sup.th IEEE International Symposium on Personal, Indoor and Mobile Radio Communications, Barcelona, Spain, Sep. 5-8, 2004, pp. 2876-2883.*

* cited by examiner

*Primary Examiner* — Nathan Flynn
*Assistant Examiner* — Abdullah Almamun
(74) *Attorney, Agent, or Firm* — Guntin & Gust, PLC; Ralph Trementozzi

(57) ABSTRACT

A system that incorporates teachings of the present disclosure may include, for example, a computer-readable storage medium in a communication device having computer instructions to establish communications with a cellular base station, generate a message request, and transmit to an authentication device by way of the cellular base station the message request. The computer-readable storage medium can also have computer instructions to receive from the authentication device by way of the cellular base station a message response, authenticate the message response, and determine from the authenticated message response whether the cellular base station is an approved network element of a cellular communication system. Other embodiments are disclosed.

19 Claims, 5 Drawing Sheets

AUTHENTICATING NETWORK ELEMENTS IN A COMMUNICATION SYSTEM

FIELD OF THE DISCLOSURE

The present disclosure relates generally to authenticating network elements in a communication system.

BACKGROUND

In GSM communication networks, rogue base stations capable of intercepting phone calls are commonly referred to as IMSI catchers (IMSI standing for International Mobile Subscriber Identity). When cellular phones are near an IMSI catcher they generally receive a stronger signal from the IMSI catcher than a cellular base station tower at a distance. With a stronger signal, the IMSI catcher can cause the cellular phone to establish communications with the IMSI catcher rather than a legitimate cellular base station tower. Once the cellular phone is in communication with the IMSI catcher, calls initiated by a user of the cellular phone can be intercepted by a user of the IMSI catcher, thereby compromising the cellular phone user's privacy.

DETAILED DESCRIPTION

One embodiment of the present disclosure includes a communication device having a wireless transceiver coupled to a processor. The processor can be operable to establish communications with a wireless base station, generate an encrypted message request, and transmit to a server by way of the wireless base station the encrypted message request. The processor can also be operable to receive from the server by way of the wireless base station an encrypted message response, decrypt the encrypted message response, and determine that the wireless base station is an approved network element of a communication system providing communication services to the communication device based on at least two conditions comprising information included in the decrypted message response and an ability of the wireless base station to deliver to the communication device the encrypted message response transmitted by the server.

One embodiment of the present disclosure includes a computer-readable storage medium in a communication device having computer instructions to establish communications with a cellular base station, generate a message request, and transmit to an authentication device by way of the cellular base station the message request. The computer-readable storage medium can also have computer instructions to receive from the authentication device by way of the cellular base station a message response, authenticate the message response, and determine from the authenticated message response whether the cellular base station is an approved network element of a cellular communication system. The authentication device can be communicatively coupled to the cellular base station, and remotely located therefrom.

One embodiment of the present disclosure includes an authentication device having a memory coupled to a controller. The controller can operable to receive by way of a cellular base station a message request from a communication device, generate a message response, and transmit to the communication device by way of the cellular base station the message response to enable the communication device to determine whether the cellular base station is an approved network element of a cellular communication system.

Figure 1:
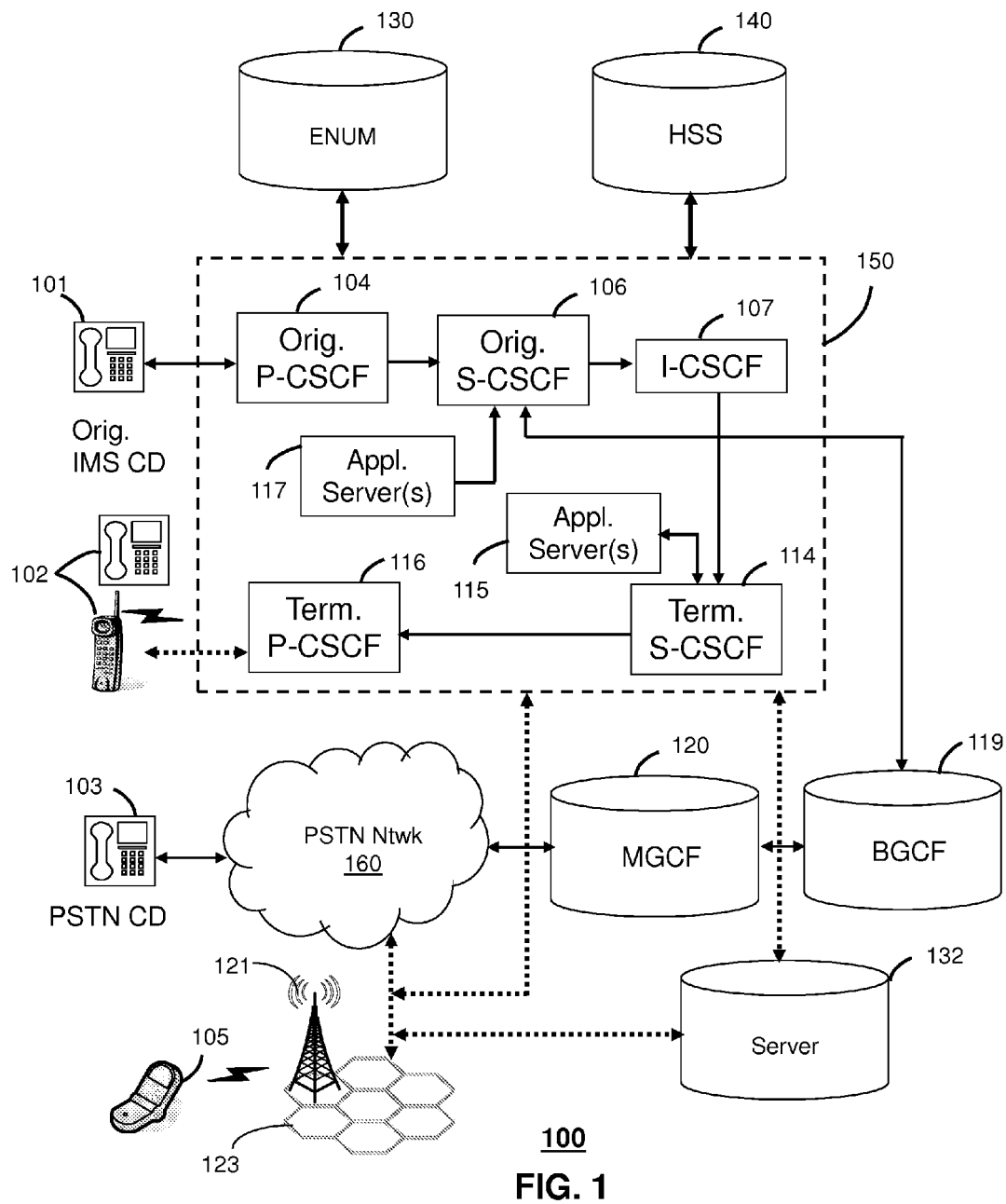
FIG. 1 depicts an illustrative embodiment of a communication system.

FIG. 1 depicts an illustrative embodiment of a communication system 100. The communication system 100 can be represented by a cellular communication network 123 with a plurality of base stations 121 that provide wireless communication services over an expansive geographic region such as a city, state, or nation. The cellular communication network 123 can operate according to wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), or Long Term Evolution or LTE, and so on). Other present and next generation wide area wireless network technologies are contemplated by the present disclosure.

Cellular phones supporting LTE can support packet-switched voice and packet-switched data communications and thus may operate as IP Multimedia Subsystem (IMS)-compliant devices. In this embodiment, the cellular base station 121 can communicate directly with an IMS network 150—symbolically depicted by the bidirectional arrow between the cellular communication network 123 and the IMS network 150. The IMS network 150 can be coupled to a Home Subscriber Server (HSS) 140, a tElephone NUmber Mapping (ENUM) server 130, and other common network elements of an IMS network 150. The IMS network 150 can establish communications between IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 is generally not necessary when a communication session involves IMS CD to IMS CD communications. A communication session involving at least one PSTN CD may utilize the MGCF 120.

IMS CDs 101, 102 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 140. To initiate a communication session between CDs, an originating IMS CD 101 can submit a Session Initiation Protocol (SIP INVITE) message to an originating P-CSCF 104 which communicates with a corresponding originating S-CSCF 106. The originating S-CSCF 106 can submit the SIP INVITE message to one or more application servers (ASs) 117 that can provide a variety of services to IMS subscribers.

Additionally, the originating S-CSCF 106 can submit queries to the ENUM system 130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications.

If the terminating CD is instead a PSTN CD such as CD 103 or CD 105 (in instances where the cellular phone only supports circuit-switched voice communications), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

In some instances the aforementioned communication process between IMS CDs is symmetrical. Accordingly, the terms "originating" and "terminating" in FIG. 1 may be interchangeable. It is further noted that communication system 100 can be adapted to support video conferencing. In addition, communication system 100 can be adapted to provide the IMS CDs 101, 102 with multimedia and Internet services. It is further contemplated that the CDs of FIG. 1 can be communicatively coupled to an access point such as a femtocell (not shown), a WiFi router, a DECT base unit, or another suitable wireless access point to establish communications with the IMS network 150 of FIG. 1.

The IMS network 150 and/or the cellular communication network 123 may also be communicatively coupled to a server 132 which as will be described below can enable a cellular communication device 105 to determine whether a cellular base station 121 which it has established communications with is a legitimate network element of the cellular communication network 123.

Figure 2:
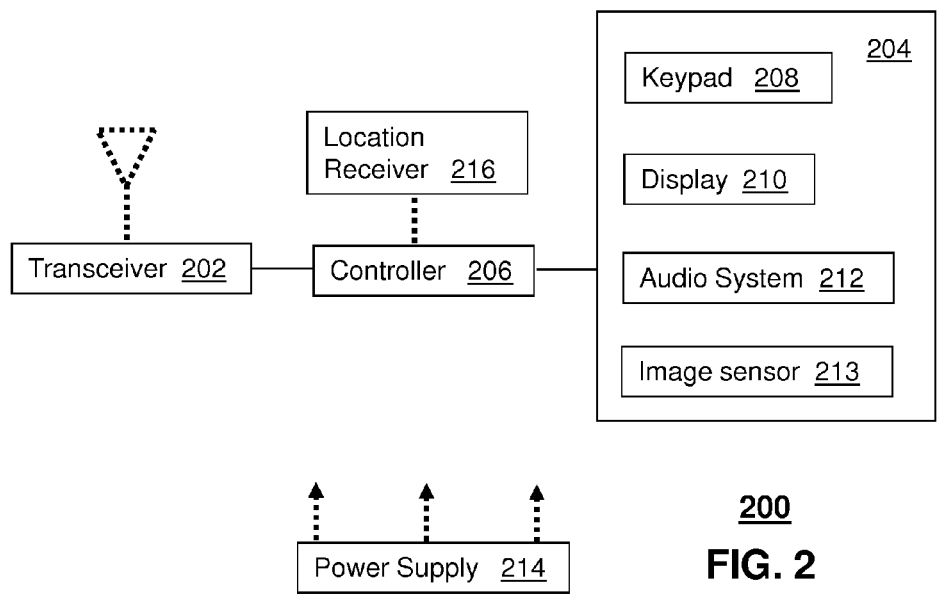
FIG. 2 depicts an illustrative embodiment of a communication device utilized in the communication system of FIG. 1.

FIG. 2 depicts an exemplary embodiment of a communication device 200. Communication device 200 can serve in whole or in part as an illustrative embodiment of the devices depicted in FIG. 1. The communication device 200 can comprise a wireline and/or wireless transceiver 202 (herein transceiver 202), a user interface (UI) 204, a power supply 214, a location receiver 216, and a controller 206 for managing operations thereof. The transceiver 202 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 202 can also be adapted to support circuit-switched wireline access technologies (such as PSTN), packet-switched wireline access technologies (such as TCPIP, VoIP, etc.), and combinations thereof.

The UI 204 can include a depressible or touch-sensitive keypad 208 with a navigation mechanism such as a roller ball, a thumbwheel, a joystick, a mouse, or a navigation disk for manipulating operations of the communication device 200. The keypad 208 can be an integral part of a housing assembly of the communication device 200 or an independent device operably coupled thereto by a tethered wireline interface (such as a USB cable) or a wireless interface supporting for example Bluetooth. The keypad 208 can represent a numeric dialing keypad commonly used by phones, and/or a Qwerty keypad with alphanumeric keys used by smart phones. The UI 204 can further include a display 210 such as monochrome or color LCD (Liquid Crystal Display), OLED (Organic Light Emitting Diode) or other suitable display technology for conveying images to an end user of the communication device 200. In an embodiment where the display 210 is touch-sensitive, a portion or all of the keypad 208 can be presented by way of the display 210 with navigation features.

The UI 204 can also include an audio system 212 that utilizes common audio technology for conveying low volume audio (such as audio heard only in the proximity of a human ear) and high volume audio (such as speakerphone for hands free operation). The audio system 212 can further include a microphone for receiving audible signals of an end user. The audio system 212 can also be used for voice recognition applications. The UI 204 can further include an image sensor 213 such as a charged coupled device (CCD) camera for capturing still or moving images.

The power supply 214 can utilize common power management technologies such as replaceable and rechargeable batteries, supply regulation technologies, and charging system technologies for supplying energy to the components of the communication device 200 to facilitate long-range or short-range portable applications. The location receiver 216 can utilize common location technology such as a global positioning system (GPS) receiver capable of assisted GPS for identifying a location of the communication device 200 based on signals generated by a constellation of GPS satellites, thereby facilitating common location services such as navigation.

The communication device 200 can use the transceiver 202 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such a Flash, ROM, RAM, SRAM, DRAM or other storage technologies.

The communication device 200 can be adapted to perform the functions of CDs 101, 102, 103 and 105 of FIG. 1. It will be appreciated that the communication device 200 can also represent other common devices that can operate in communication system 100 of FIG. 1.

Figure 3:
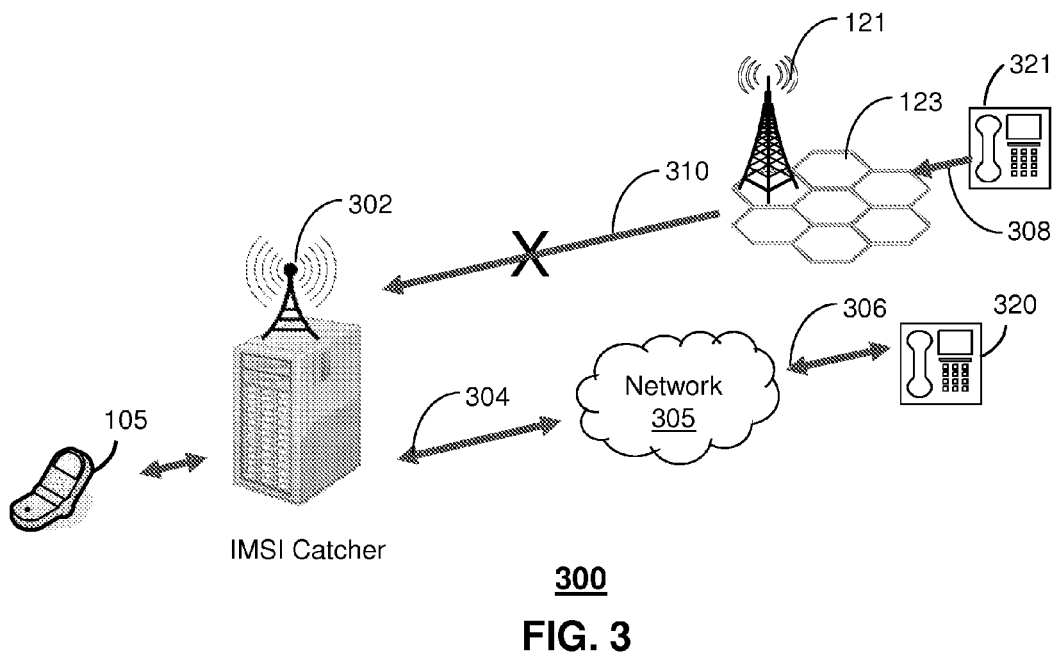
FIG. 3 depicts an illustrative embodiment of a rogue base station operating in the communication system of FIG. 1.

FIG. 3 depicts an illustrative embodiment of a rogue base station 302 (referred to herein for illustrative purposes only as an IMSI catcher 302) operating in the communication system 100 of FIG. 1. The IMSI catcher 302 can be adapted to transmit a cellular signal that supersedes the signal strength of signals transmitted by the cellular base station 121. When the cellular phone 105 detects the signal of the IMSI catcher 302 and is able to establish communications therewith, the IMSI catcher 302 can direct the cellular phone 105 to utilize the IMSI catcher 302 to establish communication services with the cellular communication network 123. Unbeknownst to the cellular phone 105, however, it has established communications with an IMSI catcher 302 which is acting illegitimately as a cellular base station 121.

Generally, the IMSI catcher 302 is communicatively coupled to a communication network 305. Communication network 305 can be a PSTN network, an IMS network, an Internet Service Provider (ISP) network or any other type of communication system that can provide voice and/or data services. The network 305 may be operated by a different service provider than the service provider of the cellular communication network 123. When the cellular phone 105 originates a call, the IMSI catcher 302 can complete the call at a terminal device 320 targeted by the cellular phone 105 by way of the communication network 305 over communication link 306 by emulating the call function that would have normally taken place over the cellular communication network 123. The terminal device 320 can be a landline phone (or a cellular phone—not shown). A full duplex communication session can take place between the cellular phone 105 and terminal 320 by way of the IMSI catcher 302 and the communication network 305.

However, once another terminal device 321 attempts to communicate with the cellular phone 105 over communication link 308, the communication that would normally take place over link 310 by way of a cellular base station 121 would fail because to the cellular communication network 123 the cellular phone 105 appears not to be in operation since it is not communicatively coupled to any the cellular base stations 121 of the cellular communication system 123. This asymmetry in communications can be used in part to identify rogue base stations such as the IMSI catcher 302 of FIG. 3 in accordance with the embodiments disclosed herein.

Figure 4:
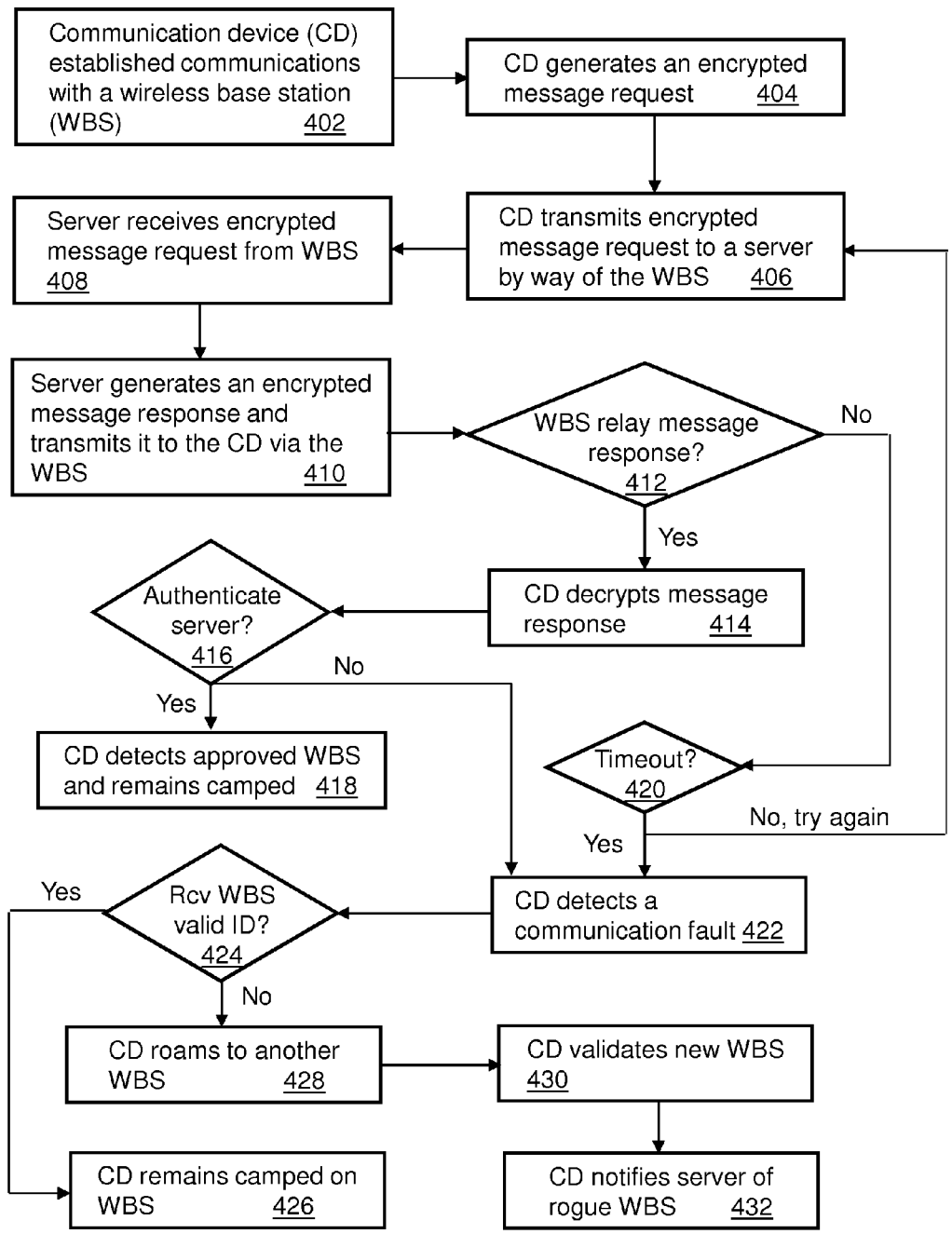
FIG. 4 depicts an illustrative embodiment of a method operating in portions of the devices of FIGS. 1-2.
Figure 5:
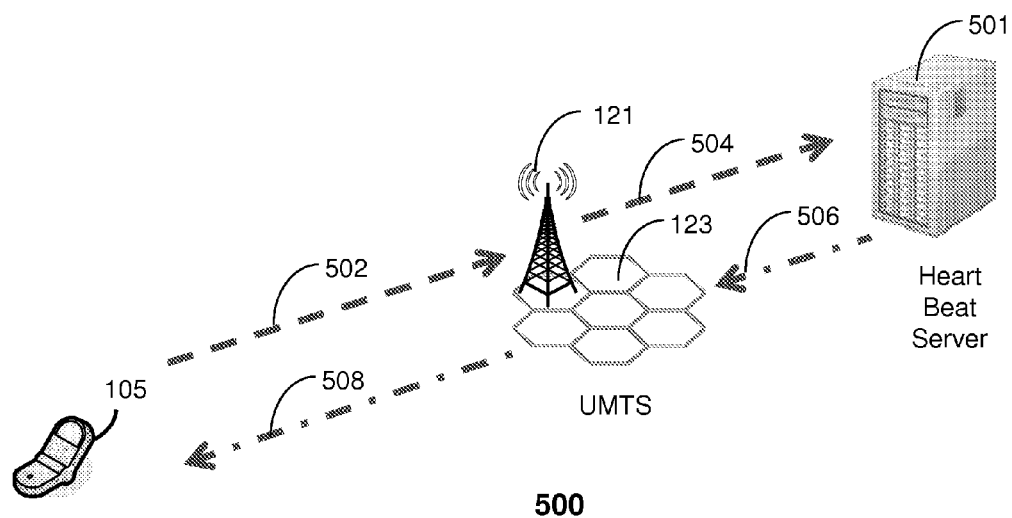
FIGS. 5-6 depict illustrative embodiments for detecting a rogue base station according to the method of FIG. 4.
Figure 6:
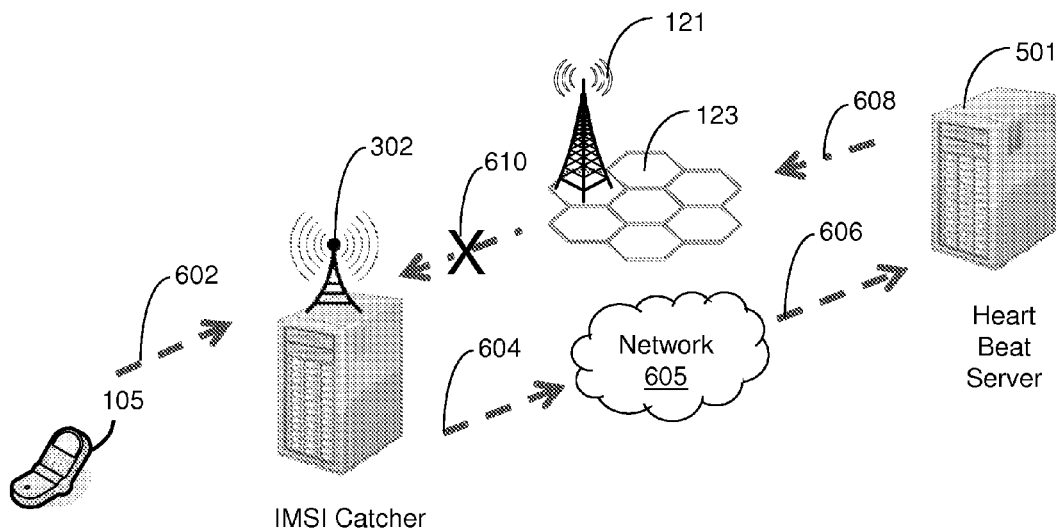

FIG. 4 depicts an illustrative method 400 that operates in portions of the devices of FIGS. 1-2 to detect the rogue base station of FIG. 3. FIGS. 5-6 depict supporting illustrations of the embodiments of method 400. Method 400 can begin with step 402 in which a communication device such as the cellular phone 105 of FIGS. 1-3 establishes communications with a wireless base station such as cellular base station 121. In step 404, the cellular phone 105 can be adapted to generate an encrypted message request which it directs to the server 132 at step 406 to authenticate the cellular base station 121. The cellular phone 105 can utilize any encryption technique to encrypt the message request. For illustration purposes only, it is assumed that the cellular phone 105 is adapted to use a public key infrastructure (PKI) technique for secure communications with the server 132.

In one embodiment, the cellular phone 105 and the server 132 can be configured by a PKI certificate authority. Once configured, the cellular phone 105 and server 132 can exchange secure messages that cannot be readily modified by a cellular base station 121. In one embodiment, step 404 can represent several exchanges between the cellular phone 105 and the server 132. For instance, once the cellular phone 105 establishes communications with the cellular base station 121 in step 402 depicted by communication link 502 of FIG. 5, the cellular phone 105 can initiate data communications with the server 132 and transmit an X.509 certificate including a public key of the cellular phone 105. The server 132 can identify the cellular phone 105 from its certificate and in reply submit its X.509 certificate to the cellular phone 105 with a copy of its public key over communication link 506. The certificate of the server 132 can then be conveyed by the base station 121 to the cellular phone 105 over communication link 508.

With the public keys exchanged between the cellular phone 105 and the server 132, the cellular phone 105 and the server 132 can engaged in encrypted communications. The cellular phone 105 can encrypt in step 404 a message request with the public key of the server 132 and sign the encrypted message with the private key of the cellular phone 105. In step 406, the cellular phone 406 can transmit the signed encrypted message to the server 132 by way of the base station 121, which is received by the server in step 408. In step 410, the server 132 can generate an encrypted message response with the public key of the cellular phone and sign it with the server's private key. The server 132 can then transmit the signed encrypted message response to the cellular phone 105 via the base station 121. If the base station 121 is a legitimate base station, then the cellular phone 105 can receive at step 412 the signed encrypted message response over communication link 506 and supply the encrypted message response to the cellular phone 105 over communication link 508.

At step 414, the cellular phone 105 can decrypt the message response in step 414 using the PKI technology discussed above. For example, the cellular phone 105 can decrypt the encrypted message response from the server 132 with the private key of the cellular phone 105 and decrypt the signature of the server 132 with the public key of the server 132. Once the message response has been decrypted successfully, the cellular phone 105 can determine that the message response is authentic and not a forgery created by the base station 121. In one embodiment, the cellular phone 105 can be adapted to detect the authenticity of the cellular base station 121 based solely on the ability of the cellular base station 121 to deliver the signed encrypted response message to the cellular phone 105. However, as a precaution, the cellular phone 105 can be adapted to also rely on a successful decryption of the encrypted message response at step 414 as a second condition to determine at step 416 that the cellular base station 121 is a legitimate network element of the cellular communication network 123. Once the cellular base station 121 has been authenticated, in step 418, the cellular phone 105 can safely engage in voice and/or data communications as directed by the user of the cellular phone 105.

If, on the other hand, the cellular phone 105 is unable to successfully decrypt the message response utilizing PKI technology, and the resulting message is indecipherable, then the cellular phone 105 can be adapted to proceed to step 422 where it detects a communication fault. There may be instances that a legitimate law enforcement agency has the legal right to use an authorized mobile base station to monitor calls of one or more individuals. To determine whether the communication fault requires mitigation, the cellular phone 105 can submit a request to the cellular base station 121 to provide information such as an identifier to legitimize its function in the cellular communication network 123. The mobile base station of the law enforcement agency can be adapted to supply the cellular phone 105 a secure identifier which identifies it as a law enforcement base station. The identifier can be made secure with PKI technology as described earlier, and can be supplied to the cellular phone 105 by a trusted certificate authority and/or the law enforcement agency.

If a legitimate identifier is transmitted to the cellular phone 105 by the mobile cellular base station of the law enforcement agency in step 424, the cellular phone 105 can proceed to step 426 and continue to utilize the communication services of the mobile base station. If, however, a legitimate identifier is not received from the mobile base station because it is likely a rogue base station without authority to function in the cellular communication network 123, the cellular phone 105 can proceed to step 428 where it establishes communications with another cellular base station accessible to the cellular phone 105. In step 430, the cellular phone 105 can perform the validation steps with the server 132 described earlier to determine if the new cellular base station is a valid network element of the communication system 100. If the new cellular base station is a valid network element, the cellular phone 105 can notify the server 132 (or another network element of the communication system 100) that it has detected a rogue cellular base station at step 432. The notification supplied by the cellular phone 105 can include the GPS coordinates of the cellular phone 105 when it was in communication with the purported rogue base station to assist the service provider of the communication system 100 and/or law enforcement to locate the rogue base station and possibly apprehend the parties engaging in unlawful monitoring of cellular communication services.

Referring back to step 412, if an encrypted message response is not received by the cellular phone 105 in this step, then it is likely that the cellular phone 105 has established communications with an IMSI catcher 302 such as shown in FIG. 6. This situation can arise from the cellular phone 105 transmitting an encrypted message request over communication link 602, which the IMSI catcher 302 relays to communication network 605 over communication link 604. The communication network 605 in turn supplies the encrypted message request of the cellular phone 105 to the server 132 over communication link 606. Since the server 132 is unaware of the IMSI catcher 302, the server 132 initiates a data communication session over the cellular communication network 123 by way of communication link 608 to respond to the encrypted message request of the cellular phone 105. Upon receiving the encrypted message response of the server 132, the cellular base station 121 will attempt to transmit to the cellular phone 105 over a wireless data channel depicted by communication link 610 the encrypted message response. Since the cellular phone 105 is not communicatively coupled to the cellular communication network 123, the communication attempt over link 610 fails and the communication session ends.

Upon failing to receive the encrypted message response after a timeout period in step 420, the cellular phone 105 can reinitiate steps 406 through 412 in the event a message interruption occurred or some other anomalous activity that prevented a legitimate cellular base station 121 to supply the encrypted message response. The cellular phone 105 can be provisioned to make a predetermined number of attempts. If all attempts fail, the cellular phone 105 can proceed to any combination of steps 422-432 as described above.

Upon reviewing the aforementioned embodiments, it would be evident to an artisan with ordinary skill in the art that said embodiments can be modified, reduced, or enhanced without departing from the scope and spirit of the claims described below. For example, method 400 can be adapted so that the cellular phone 105 and the server 132 exchange unencrypted messages. Additionally, method 400 can be adapted so that the cellular phone 105 relies only on the ability of the cellular base station 121 to deliver to the cellular phone 105 a message response of the server 132 to determine the legitimacy of the cellular base station 121. Method 400 can also be adapted so that the cellular phone 105 submits a notice to the server 132 via the rogue base station indicating that the cellular base station to which the cellular phone 105 is communicatively couple to is a rogue base station. This latter embodiment is possible since the rogue base station does not block calls initiated by the cellular phone 105 to the server 132. Other suitable embodiments are contemplated by the present disclosure.

Figure 7:
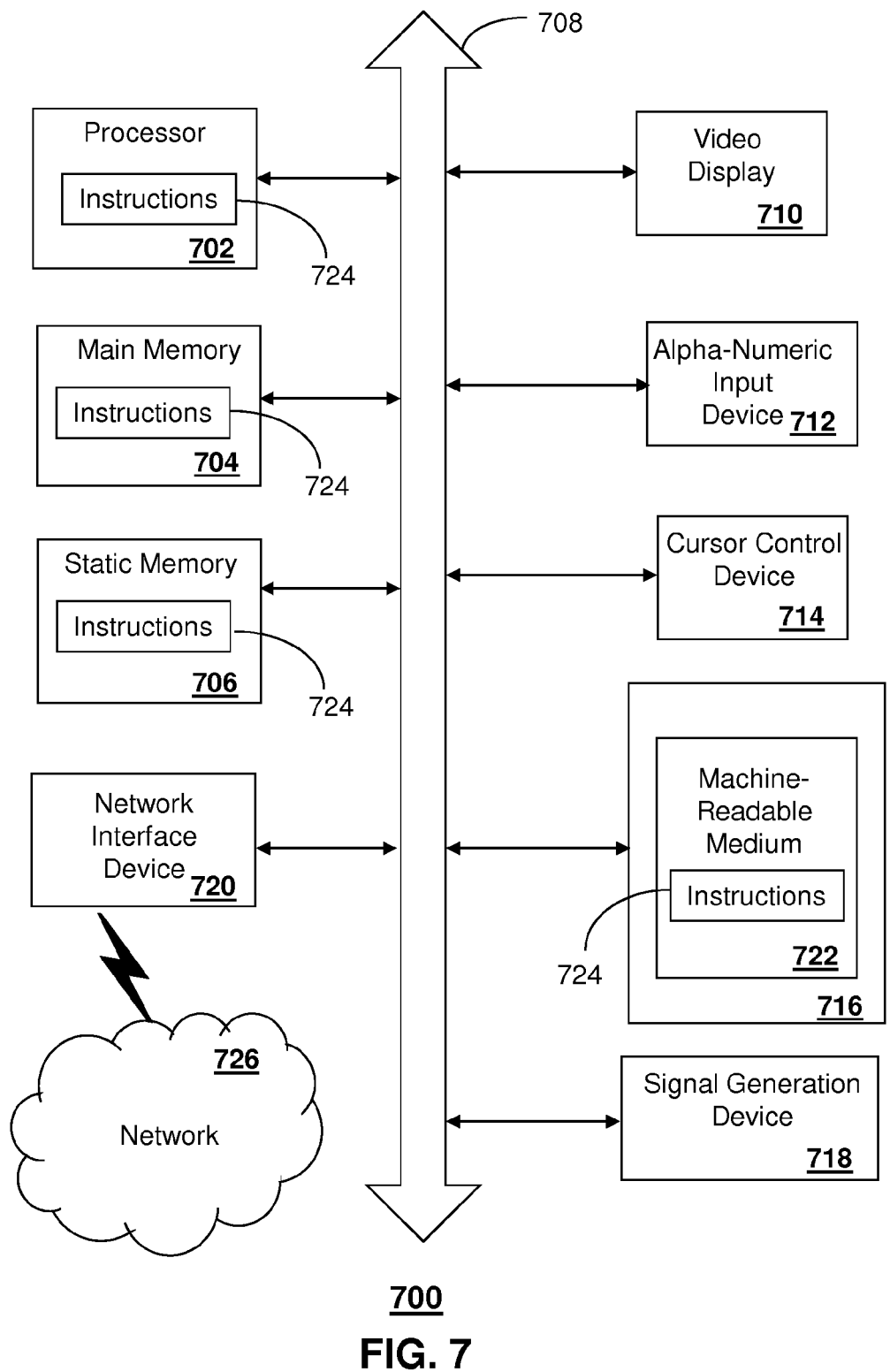
FIG. 7 is a diagrammatic representation of a machine in the form of a computer system within which a set of instructions, when executed, may cause the machine to perform any one or more of the methods discussed herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the devices of FIGS. 1-2. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a wireless transceiver;
   a memory to store computer instructions; and
   a processor coupled to the wireless transceiver and to the memory, wherein the processor, responsive to executing the computer instructions, performs operations comprising:
   establishing communications with a wireless base station;
   generating an encrypted message request;
   transmitting to a server by way of the wireless base station the encrypted message request;
   receiving from the server by way of the wireless base station an encrypted message response;
   decrypting the encrypted message response, resulting in a decrypted message response;
   determining that the wireless base station is an approved network element of a communication system providing communication services to the communication device based on at least two conditions comprising information included in the decrypted message response and an ability of the wireless base station to deliver to the communication device the encrypted message response transmitted by the server;
   establishing communications with a second wireless base station;
   generating a second encrypted message request;
   transmitting the second encrypted message request to the server by way of the second wireless base station;
   detecting a communication fault based on a failure to receive from the server by way of the second wireless base station an expected second encrypted message response; and
   determining from the communication fault that the second wireless base station is not a approved network element of the communication system.

2. The communication device of claim 1, wherein the operations further comprise generating the encrypted message request with a first private key stored in the communication device, and wherein the encrypted message request is transmitted to the server to cause the server to generate the encrypted message response with a second private key stored in the server, and causing the server to transmit the encrypted message response to the communication device by way of the wireless base station.

3. The communication device of claim 1, wherein the operations further comprise detecting that the second wireless base station is operated by a law enforcement agency.

4. The communication device of claim 3, wherein the operations further comprise detecting that the second wireless base station is operated by the law enforcement agency responsive to receiving an encrypted law enforcement message from the second wireless base station.

5. The communication device of claim 3, wherein the operations further comprise maintaining communications with the second wireless base station responsive to detecting that the second wireless base station is operated by the law enforcement agency.

6. The communication device of claim 1, wherein the operations further comprise detecting that the second wireless base station is not operated by a legitimate party after an attempt to prompt the server to transmit to the communication device the expected second encrypted message response.

7. The communication device of claim 6, wherein the operations further comprise:
   establishing communications with a third wireless base station responsive to detecting that the second wireless base station is not operated by a legitimate party;
   validating that the third wireless base station is an approved network element of the communication system by receiving by way of the third wireless base station a third encrypted message from the server; and transmitting a notice to the server that the second wireless base station is not a valid network element of the communication system.

8. The communication device of claim 1, wherein the operations further comprise transmitting to the server by way of the wireless base station a first public key associated with the communication device.

9. The communication device of claim 8, wherein the operations further comprise receiving from the server by way of the wireless base station a second public key associated with the server.

10. The communication device of claim 9, wherein the operations further comprise encrypting the message request with the second public key associated with the server and signing the encrypted message request with a first private key associated with the communication device, and wherein the server is operable to encrypt the message response with the first public key associated with the communication device and sign the encrypted message response with a second private key associated with the server.

11. The communication device of claim 10, wherein the operations further comprise decrypting the encrypted message response with the first private key associated with the communication device and decrypting a signature of the server with the second public key associated with the server, and wherein the server is operable to decrypt the encrypted message request with the second private key associated with the server and decrypt the signature of the communication device with the first public key associated with the communication device.

12. The communication device of claim 1, wherein the communication device is a cellular telephone, wherein the wireless base station is a cellular base station, and wherein the communication system is one of a cellular communication network and an internet protocol multimedia subsystem communication network.

13. A non-transitory computer-readable storage medium, comprising computer instructions that when executed by a processor in a communication device, cause the processor to perform operation comprising:

establishing communications with a cellular base station;

generating a message request;

transmitting to an authentication device by way of the cellular base station the message request, wherein the authentication device is communicatively coupled to the cellular base station, and wherein the authentication device is remotely located from the cellular base station;

receiving from the authentication device by way of the cellular base station a message response;

authenticating the message response, resulting in an authenticated message response;

determining from the authenticated message response whether the cellular base station is an approved network element of a cellular communication system;

receiving a request to initiate a communication session with a second communication device, and perforating one of:

transmitting a call origination request to the cellular base station to initiate the communication session with the second communication device upon determining from the authenticated message response that the cellular base station is an approved network element of the cellular communication system;

rejecting the request to initiate the communication session with the second communication device upon determining from the authentication message response that the cellular base station is not an approved network element of the cellular communication system; or transmitting the call origination request to a second cellular base station authenticated by the communication device, wherein the communication device determining from the authenticated message response that the cellular base station is not an approved network element of the cellular communication system.

14. The non-transitory computer-readable storage medium of claim 13, wherein the message request and message response are encrypted messages.

15. The non-transitory computer-readable storage medium of claim 13, wherein the determining from the authenticated message response whether the cellular base station is an approved network element of a cellular communication system is based on a plurality of conditions comprising information included in the message response and an ability of the cellular base station to deliver to the communication device the message response.

16. The non-transitory computer-readable storage medium of claim 13, wherein the computer-readable storage medium comprises one of a subscriber identity module and re-usable identification module.

17. An authentication device, comprising:

a memory to store computer instructions;

a controller coupled to the memory, wherein the controller, responsive to executing the computer instructions, performs operations comprising:

receiving by way of a cellular base station a message request from a communication device;

generating a message response;

transmitting to the communication device by way of the cellular base station the message response to enable the communication device to determine whether the cellular base station is an approved network element of a cellular communication system; and receiving a message alert from the communication device identifying the cellular base station as an unapproved network element of the cellular communication system responsive to the communication device failing to receive by way of the cellular base station the message response transmitted by the authentication device.

18. The authentication device of claim 17, wherein the message request and message response are encrypted messages.

19. The authentication device of claim 17, wherein the operations further comprise receiving the message alert from one of the cellular base station and a second cellular base station communicatively, and wherein the communication device establishes communications with the second cellular base station upon the communication device determining that the cellular base station is an unapproved network element of the cellular communication system.

\* \* \* \* \*